US009432520B2

(12) United States Patent
Ramprasad

(10) Patent No.: US 9,432,520 B2
(45) Date of Patent: Aug. 30, 2016

(54) PROXY-BASED USAGE TRACKING FOR A WIRELESS DEVICE

(71) Applicant: TracFone Wireless, Inc., Miami, FL (US)

(72) Inventor: Satish Ramprasad, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 209 days.

(21) Appl. No.: 14/212,982

(22) Filed: Mar. 14, 2014

(65) Prior Publication Data

US 2014/0273948 A1    Sep. 18, 2014

Related U.S. Application Data

(60) Provisional application No. 61/782,111, filed on Mar. 14, 2013.

(51) Int. Cl.
| | | |
|---|---|---|
| *H04M 11/00* | (2006.01) | |
| *H04M 15/00* | (2006.01) | |
| *H04L 12/14* | (2006.01) | |
| *H04W 4/24* | (2009.01) | |

(52) U.S. Cl.
CPC .......... *H04M 15/58* (2013.01); *H04L 12/1403* (2013.01); *H04L 12/1485* (2013.01); *H04M 15/62* (2013.01); *H04M 15/8033* (2013.01); *H04W 4/24* (2013.01)

(58) Field of Classification Search
CPC ........... H04L 12/1403; H04L 12/1485; H04L 43/028; H04M 15/41
USPC .................................................. 455/406, 408
See application file for complete search history.

(56) References Cited

U.S. PATENT DOCUMENTS

| | | |
|---|---|---|
| 6,745,011 B1 | 6/2004 | Hendrickson et al. |
| 7,474,645 B2 | 1/2009 | Lundin |
| 7,747,240 B1 | 6/2010 | Briscoe et al. |
| 8,009,573 B2 | 8/2011 | Duan |
| 8,180,333 B1 | 5/2012 | Wells et al. |
| 8,290,471 B1 * | 10/2012 | Jones ................. H04L 12/1403 379/111 |
| 2003/0153333 A1 | 8/2003 | Shirai et al. |
| 2003/0232615 A1 | 12/2003 | Kim et al. |
| 2009/0156262 A1 | 6/2009 | Nagase |
| 2009/0264097 A1 | 10/2009 | Cai et al. |
| 2010/0151816 A1 | 6/2010 | Besehanic et al. |

(Continued)

OTHER PUBLICATIONS

VLOOKUP Approximate Match Tutorial (https://www.youtube.com/watch?v=OxGrLZEL86w—Nov. 22, 2012).*

*Primary Examiner* — David Q Nguyen
(74) *Attorney, Agent, or Firm* — Baker Hostetler LLP

(57) ABSTRACT

A method for tracking usage of a wireless device includes monitoring a communications trigger to initiate communication with a wireless device over a wireless network, determining an identifier of the communication, comparing the identifier of the communication with a database including two or more communication identifiers and two or more proxy identifiers, each communication identifier being associated with a corresponding proxy identifier, identifying, in response to a comparison of the identifier of the communication with the database, a proxy corresponding with the identifier of the communication, monitoring data from the wireless device to a destination through the identified proxy, and receiving usage of the wireless device from the identified proxy to track the usage of the wireless device.

20 Claims, 6 Drawing Sheets

(56) References Cited

U.S. PATENT DOCUMENTS

| | | | |
|---|---|---|---|
| 2011/0235520 A1* | 9/2011 | Maciej | H04M 3/42221 370/241 |
| 2011/0275344 A1 | 11/2011 | Momtahan | |
| 2012/0054661 A1* | 3/2012 | Rados | H04L 41/5032 715/772 |
| 2012/0069748 A1 | 3/2012 | Van Den Bogaert | |
| 2012/0140672 A1 | 6/2012 | Buckman et al. | |
| 2012/0157039 A1 | 6/2012 | Lotter | |
| 2012/0196563 A1 | 8/2012 | Rudich et al. | |
| 2012/0214441 A1 | 8/2012 | Raleigh | |
| 2014/0095362 A1* | 4/2014 | Friedholm | G06Q 30/04 705/34 |
| 2014/0273941 A1* | 9/2014 | Ramprasad | H04W 4/24 455/406 |

\* cited by examiner

PROXY-BASED USAGE TRACKING FOR A WIRELESS DEVICE

CROSS-REFERENCE TO RELATED APPLICATIONS

This application claims the benefit from U.S. Provisional Application No. 61/782,111 filed on Mar. 14, 2013, which is hereby incorporated by reference in its entirety for all purposes as if fully set forth herein.

TECHNICAL FIELD

The following disclosure generally relates to tracking usage of a wireless device and, more particularly, relates to tracking usage of various services of a wireless device connected to a wireless network by routing the services through various proxies.

BACKGROUND

Wireless services, such as cellular or mobile phone services, typically include voice services, Short Message Service ("SMS") services, and data services. A wireless service provider typically bundles a particular number of voice minutes, a particular number of SMS messages, and an amount of data transfer for a prepaid or postpaid monthly wireless plan. A subscriber will purchase a bundle appropriate for his/her usage. When the subscriber places or receives a call, sends or receives an SMS message, and/or uploads or downloads data from his/her wireless device, appropriate units of usage are deducted from the subscriber's monthly wireless plan.

In prior wireless networks, the usage of each wireless service could be tracked because each type of wireless service was managed by different switches. For example, voice calls were routed through circuit switches, SMS messages were routed through SMS centers ("SMSC"), and data was routed through various servers. Therefore, by monitoring and/or receiving feedback from each of the switches, the usage of a particular wireless device could be tracked.

However, emerging wireless networks route all wireless services as packet data through a single switch or limited number of switches. For example, voice calls can be transmitted as data over Long Term Evolution ("LTE") networks using various protocols, such as Voice over LTE ("VoLTE"). Therefore, voice calls in emerging wireless networks are tracked as data usage, making it difficult to appropriately deduct voice minutes from the subscriber's monthly plan. Moreover, different types of voice calls, such as free calls to the mobile network operator or paid calls to a landline, cannot be distinguished, which adds to the difficulty of determining the number of minutes that a subscriber has used. As such, the current methods of monitoring and/or receiving feedback from switches of a wireless network cannot be applied to accurately track usage of a wireless device over an emerging wireless network.

Therefore, a new method and system for more accurately tracking usage of a wireless device connected to an emerging wireless network is needed.

SUMMARY

Details of one or more implementations of proxy-based usage tracking for a wireless device are set forth in the accompanying drawings and the description below. Other aspects of the proxy-based usage tracking for a wireless device will be apparent from the description and drawings, and from the claims.

DESCRIPTION OF DRAWINGS

Like reference symbols indicate like elements throughout the specification and drawings.

DETAILED DESCRIPTION

Figure 1:
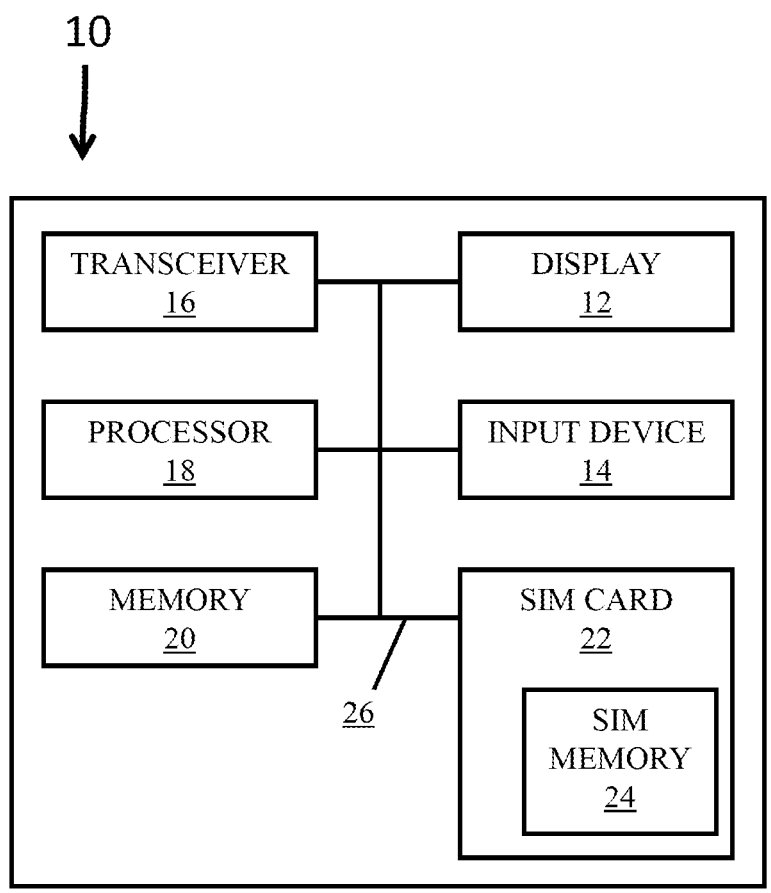
FIG. 1 illustrates a block diagram of an exemplary wireless device.

FIG. 1 illustrates a block diagram of an exemplary wireless device. The wireless device 10 can be any mobile technology computing device that connects to a wireless communication network such as, for example, a mobile phone, a wireless handset, a wireless dongle, user equipment, a mobile station, or the like. The wireless device 10 includes a display 12, an input device 14, a transceiver 16, a processor 18, a memory 20, and may include a Universal Integrated Circuit Card ("UICC") or Subscriber Identity Module ("SIM") card 22. In some implementations, the SIM card 22 can be removably received within a card slot (not shown) in the wireless device 10 and can include internal SIM memory 24. The SIM card 22 can store information such as an International Mobile Subscriber Identity ("IMSI"), a key used to identify and authenticate subscribers using the wireless device 10, or the like. The SIM card 22 can be configured to be transferred between different wireless devices 10. In other aspects, the wireless device 10 operates without a UICC or SIM card 22.

The processor 18 is capable of processing instructions for execution within the wireless device 10. For example, the processor 18 can process instructions stored in the memory 20 to display graphical information on the display 12 and/or to transmit or receive data using the transceiver 16. The processor 18 can be a single-threaded processor or a multi-threaded processor. The memory 20 can include, for example, volatile or non-volatile random access memory ("RAM") and/or read only memory ("ROM"). The components 12, 14, 16, 18, and 20 within the wireless device 10 communicate through an internal bus 26.

Figure 2:
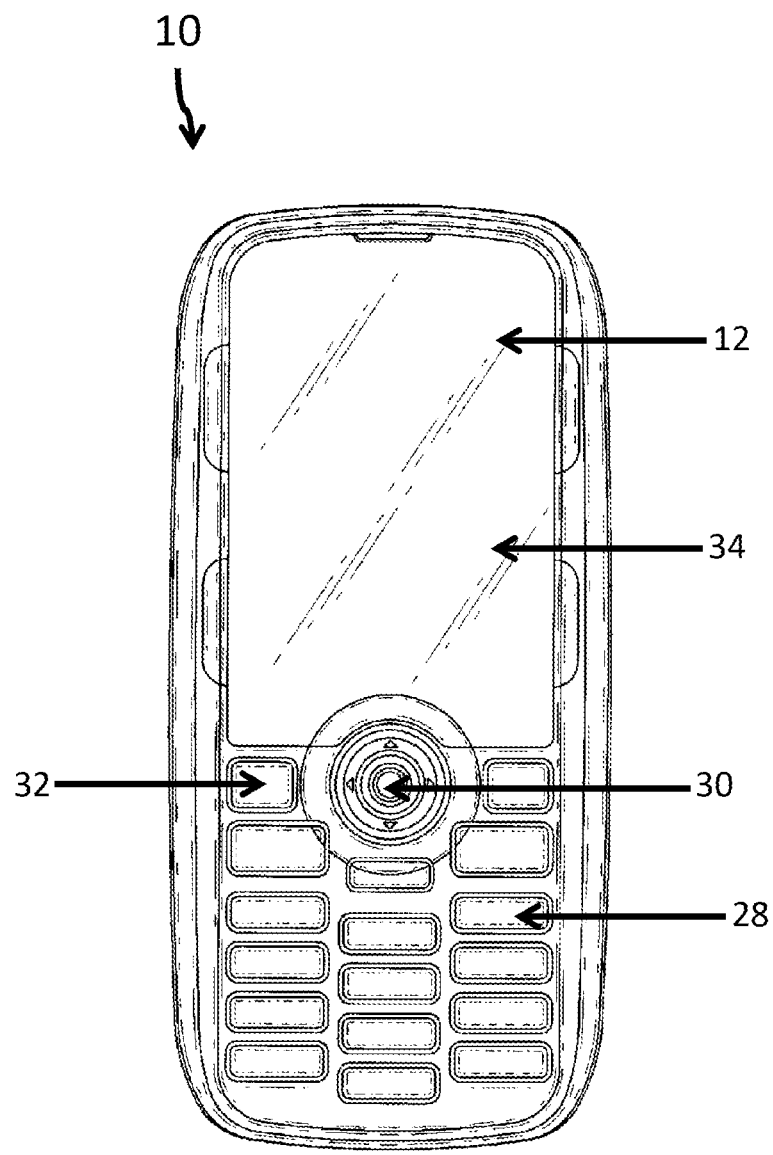
FIG. 2 illustrates an exemplary wireless device.

FIG. 2 illustrates an exemplary wireless device. The wireless device 10 may include a display 12 that is a screen that can be touch sensitive. The input device 14 can include one or more of a keypad 28, a trackball 30, selectable buttons 32, a touch screen 34 having selectable regions, or the like. The wireless device 10 may also include an antenna (not shown) coupled to the transceiver 16 to facilitate the transmission and receipt of communications by the wireless device 10.

Figure 3:
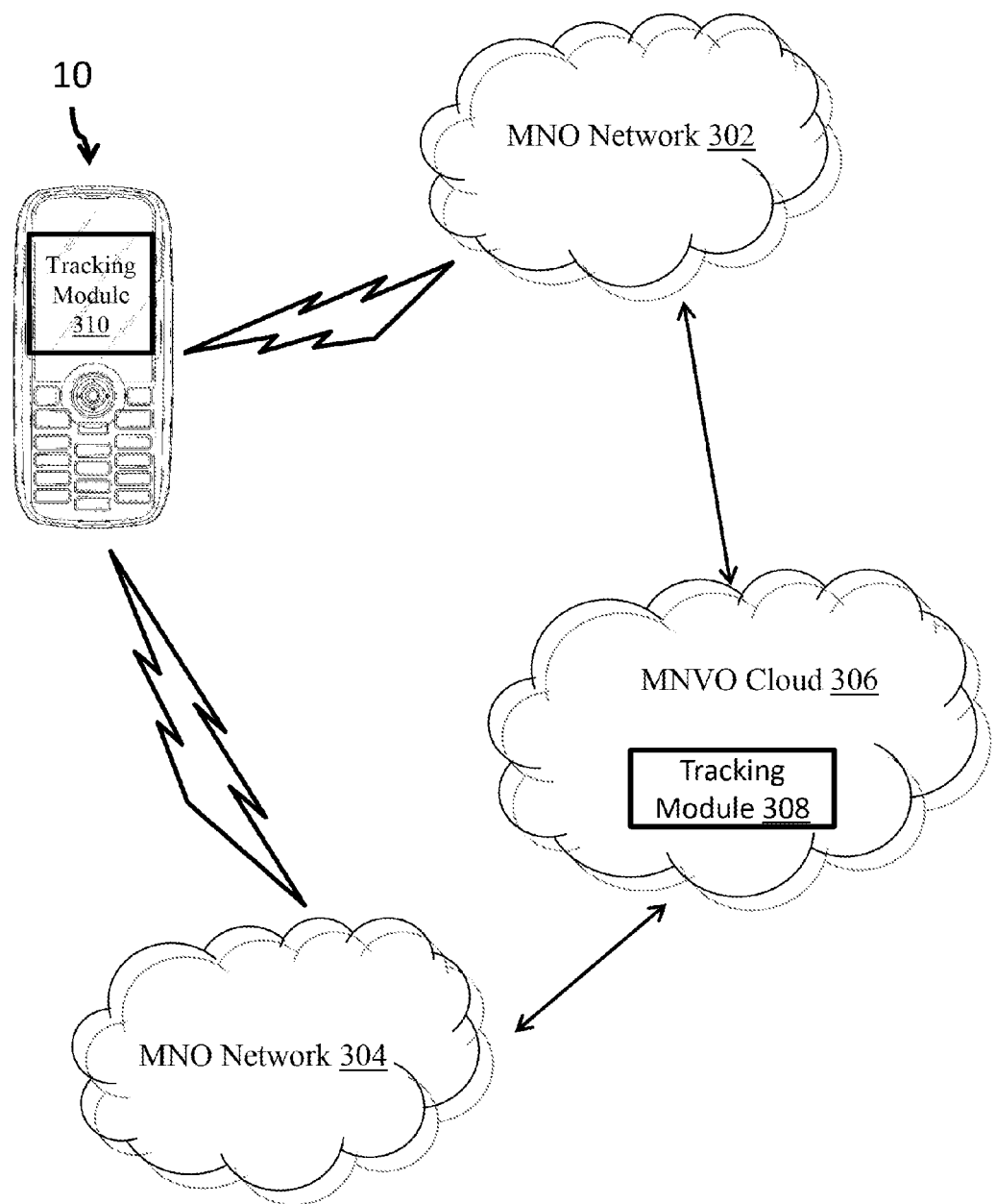
FIG. 3 illustrates a schematic diagram showing the connectivity between a wireless device, a plurality of mobile network operators, and a mobile virtual network operator.

FIG. 3 illustrates a schematic diagram showing the connectivity between a wireless device 10, a plurality of mobile network operators ("MNO") networks 302 and 304, and a mobile virtual network operator ("MVNO") cloud 306.

Although two MNO networks 302 and 304 are illustrated in FIG. 3, any number of MNO networks can be available. The wireless device 10 may connect to one of the MNO networks 302 and 304 depending on the geographic location of the wireless device 10, the availability of the MNO networks 302 and 304, and/or the service contract associated with the wireless device 10. The MNO networks 302 and 304 can be any type of wireless network, such as a cellular data network, e.g., a Global System for Mobile Communication ("GSM") network, a Code-Division Multiple Access ("CDMA") network, an Universal Mobile Telecommunications System ("UMTS") network, an Evolution-Data Optimized ("EV-DO") network, a LTE network, a wireless local network, a wide area network, and/or the like.

In some implementations, a wireless subscriber purchases a wireless communications plan from a MVNO. The MVNO is a wireless operator that typically does not own its own frequency spectrum or have its own network infrastructure. Instead, MVNOs contract for the right to access a wireless communications network owned by a MNO and sell that access to their wireless subscribers. Therefore, to provide activation, metering, additional services, and other customer services to their subscribers, MVNOs operate systems, such as the MVNO cloud 306, that communicate with the MNO networks 302 and 304.

The MVNO cloud 306 communicates with the MNO networks 302 and 304 to receive information about the usage of the wireless device 10 on the MNO networks 302 and 304. The MVNO cloud 306 can be one or more of dedicated hardware, application specific integrated circuits, programmable logic arrays, computers, and servers including one or more processors and one or more memories. For example, the one or more processors of the MVNO cloud 306 can be configured to perform the functions of the tracking module 308 and the one or more memories of the MVNO cloud 306 can be configured to store the usage information of the subscribers of the MVNO.

The usage information can include one or more of the number of calls initiated and/or received, the number of voice minutes used, the number of messages sent and/or received, the amount of data sent and/or received, the destination of each communication, and an identifier of a proxy used to send/receive the communication. The identifier of the proxy can be included in, for example, a header or the body of a packet included with the communication data. To track the usage of the wireless device 10, tracking modules 308 and/or 310 are used. The usage information can be sent to and from the tracking modules 308 and/or 310 to the MVNO cloud 306 through one or more of the MNO networks 302 and 304.

In some implementations, the tracking module 308 can be included in the MVNO cloud 306. In other implementations, the tracking module 310 can be included in the wireless device 10. In yet other implementations, the tracking modules 308 and 310 can be located in both the MVNO cloud 306 and the wireless device 10. The tracking modules 308 and 310 can be implemented as one or more of software or hardware. The tracking modules 308 and 310 can coordinate one or more of provisioning, metering, and consolidating subscription information for the wireless subscribers of the wireless device 10.

The tracking module 310 included in the wireless device 10 may be pre-installed or post-installed on the wireless device 10. The tracking module 310 may be stored or executed on, for example, the memory 20, the UICC/SIM memory 24, dedicated hardware, application specific integrated circuits, programmable logic arrays, and/or the processor 18 of the wireless device 10. The instructions for the tracking module 310 may be included in hardware of the wireless device 10 or in an application stored in the memory 20 and/or the SIM memory 24 of the wireless device 10 and run by the operating system of the wireless device 10.

Figure 4:
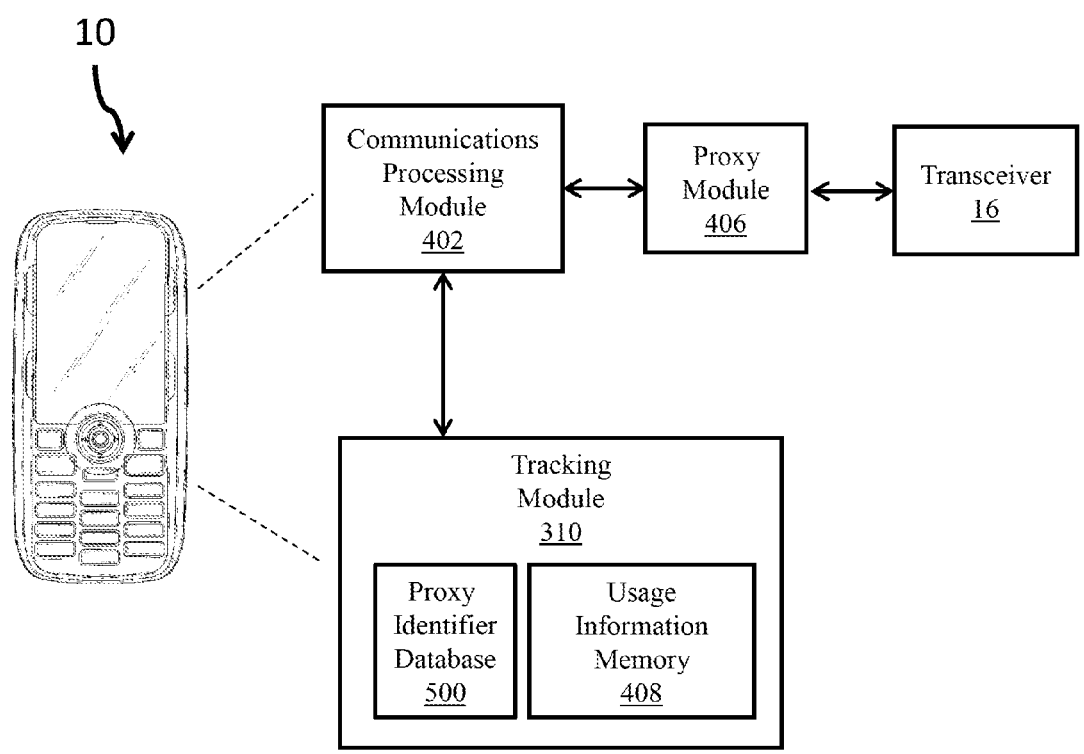
FIG. 4 illustrates a schematic block diagram of an exemplary wireless device including software modules for proxy-based usage tracking.

FIG. 4 illustrates a schematic block diagram of an exemplary wireless device including software modules for proxy-based usage tracking. In some implementations, the wireless device 10 can include two or more proxies, e.g., ports that are intermediaries for communication between the wireless device 10 and the MNO networks 302 and 304, in a proxy module 406. The proxies can be pre-configured or post-installed in the wireless device 10 and can be updated over time using Over The Air ("OTA") programming or non-OTA programming.

Referring to FIG. 4, the wireless device 10 includes at least a communications processing module 402 communicating with the transceiver 16, a tracking module 310 including a proxy identifier database 500 and a usage information memory 408, and a proxy module 406. In some implementations, the proxy module 406 can be included in the tracking module 310.

In some implementations, the modules 310, 402, and 406 are one or more of software, hardware, and firmware implementations that perform or facilitate the processes, features, and/or functions described with reference to the modules 310, 402, and 406. The processes, features, and/or functions of the modules 310, 402, and 406 may be performed with or without human interaction or augmentation.

In some implementations, the modules 310, 402, and 406 may be separate software modules or, in other implementations, the functions performed by the modules 310, 402, and 406 may be performed by a single software module. In some implementations, each of the modules 310, 402, and 406 may include multiple software modules to perform the processes, features, and/or functions of the modules 310, 402, and 406. If the modules 310, 402, and 406 are software modules, they can be stored in the memory 20 and/or the SIM memory 24 of the wireless device 10 and be executed by the processor 18 and/or a processor included on the SIM card 22.

The tracking module 310 may include a proxy identifier database 500 that associates predefined communications identifiers with predefined proxies, as explained in greater detail with reference to FIG. 5. The tracking module 310 also includes a usage information memory 408 that stores the usage information associated with a particular wireless subscriber and/or wireless device. The tracking module 310 can store the usage of various wireless services such as, for example, the number of voice calls, the number of free voice minutes used, the number of metered voice minutes used, the total number of voice minutes used, the number of free SMS messages sent and/or received, the number of metered SMS messages sent and/or received, the total number of SMS messages sent and/or received, the free amount of data uploaded and/or downloaded, the metered amount of data uploaded and/or downloaded, and the total amount of data uploaded and/or downloaded. Other types of wireless services are contemplated as well.

The usage statistics can be stored from the start of a relationship between the wireless subscriber and the MVNO and for predefined time periods. For example, the usage statistics can be stored by one month increments. The communications processing module 402 can forward the usage information from the usage information memory 408 to the MVNO cloud 306 through the MNO networks 302 and 304 at predetermined time intervals, in response to a request by the MVNO cloud 306, in response to a triggering event, or the like. For example, the usage information can be forwarded to the MVNO cloud 306 every three hours, once a day, once a week, in response to movement of the wireless device 10 from a predefined geographic area, in response to each usage of a wireless service, in response to a predefined amount of usage of one or more wireless services, in response to every startup of the wireless device 10, or the like.

The tracking module 310 also identifies the wireless device 10 and/or the particular wireless subscriber using the wireless device 10 by providing identification information of the wireless device 10 and/or the wireless subscriber. For example, the tracking module 310 can include an identification number for the wireless subscriber or an identification number for the SIM card 22 associated with the wireless subscriber, such as an Integrated Circuit Card Identification ("ICCID"), Electronic Serial Number ("ESN"), International Mobile Equipment Identity ("IMEI"), International Mobile Subscriber Identity ("IMSI"), Local Area Identity ("LAI"), or the like. The identification information can be specific to allow the MVNO to identify the wireless device 10 and/or wireless subscriber.

In some implementations, to avoid compromising the integrity of the identification information and the usage information, the information stored on the tracking module 310 can be stored in a secure memory of the wireless device 10 and/or encrypted. The identification and usage information can be provided to the MVNO cloud 306 in encrypted form and/or according to a specific network protocol.

In some implementations, usage information stored in the tracking module 310 can be displayed to the wireless subscriber on the display 12 of the wireless device 10. The usage information can be displayed in response to a request from the wireless subscriber or at a predetermined time, such as the first day of the month. Current usage information or usage information for a previous time period, such as the previous month, can be displayed.

In some implementations, the proxy identifier database 500 can be a predefined lookup table. In some implementations, the proxy identifier database 500 can be customized for the particular wireless subscriber or the wireless device 10, or be generic for a group of wireless subscribers. For example, all wireless subscribers of a particular network operator may have the same proxy identifier database 500.

The proxies can be assigned based on particular usage rules of the network operator. For example, the network operator may allow unlimited calling to a specific number of friends or family members, unlimited calling during off-peak hours, unlimited calling for customer service, unlimited calling on holidays, unlimited emergency calling, and the like. Occasionally, the network operator may also run promotions for free calls for particular subscribers or for particular wireless devices by brand, model, or operating system.

Each usage rule can be associated with its own proxy or with a more general proxy in the proxy module 406. For example, all free or unlimited calls can be communicated through a single free proxy and all metered calls can be communicated through a single metered proxy. In another example, all calls made during off-peak hours can be communicated through an off-peak proxy, all calls to friends and family can be routed through a friends and family proxy, and all metered calls can be made through a single proxy for metered calls. By using multiple proxies, the network operator can track the usage of each of its usage rules and/or promotions.

Figure 5:
FIG. 5 illustrates an exemplary proxy identifier database structure.

FIG. 5 illustrates an exemplary proxy identifier database structure. The proxy identifier database 500 includes a communication identifier field 502 and a proxy identifier field 504. In some implementations, communication identifier field 502 can include a specific event while in other implementations, the communication identifier field 502 can define a particular rule. For example, entry 510 includes an entry for calls being placed or received from the phone number 50000, whereas entry 514 includes a rule for all calls being placed or received between 9:00 PM and 6:00 AM.

Entry 510 associates a particular phone number "50000" with a free proxy. Entry 512 associates a particular contact name "Mobile Operator" with the free proxy. Entry 514 associates a voice communication occurring between 9:00 PM and 6:00 AM with the off-peak proxy. Entry 516 associates a particular phone number "911" with an emergency proxy. Entry 518 associates a particular contact name "Mom" with a friends and family proxy. Entry 520 associates a particular phone number "123-456-7890" with a friends and family proxy. Entry 522 associates a communication date "Dec. 25, 2012" with a holiday proxy. Entry 524 associates a particular mobile phone brand "Brand" with a promotion proxy. Entry 526 associates a particular wireless subscriber "Subscriber A" with the promotion proxy. Entry 528 associates a particular uniform resource locator ("URL") with the free proxy. Entry 530 associates a particular internet protocol ("IP") address with the free proxy.

Figure 6:
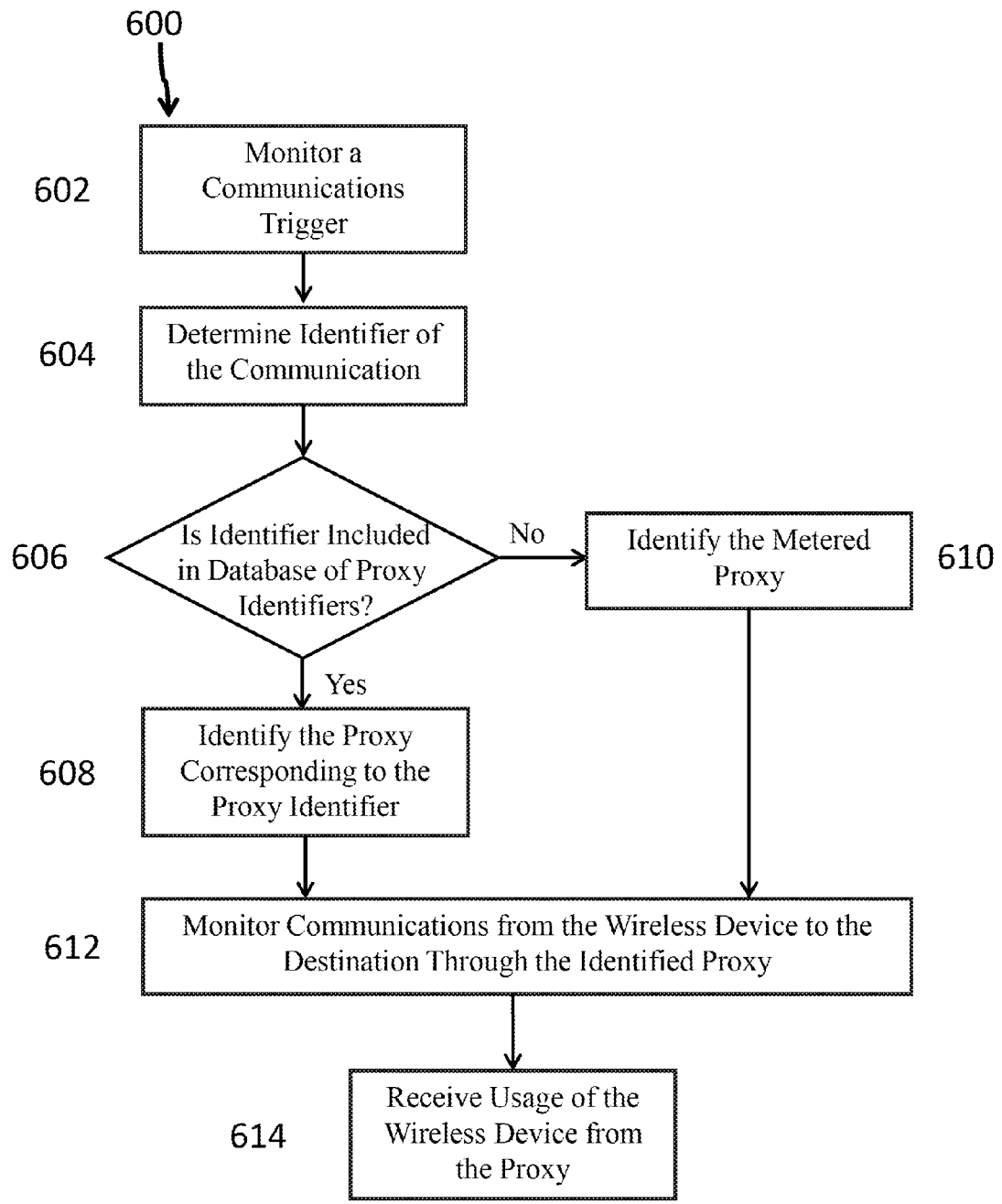
FIG. 6 illustrates a flowchart showing an exemplary process for proxy-based usage tracking for a wireless device.

FIG. 6 illustrates a flowchart showing an exemplary process for proxy-based usage tracking for a wireless device. One or more steps in the process 600 can be carried out by, for example, an electronic system such as the wireless device 10 or the MVNO cloud 306.

Initially, the communications processing module 402 and/or the MVNO cloud 306 monitors for a communication triggering event (step 602) that initiates communication with the wireless device 10 over the MNO networks 302 and 304. The triggering event can be, for example, an inbound call, a request to make an outbound call, a selection of a contact on a contact list stored on the wireless device 10, an inbound SMS message, a request to send an SMS message, a request to view a website, a request by an application to upload or download data, an incoming data broadcast from the MNO networks 302 and 304 to the wireless device 10, or the like.

Certain information about the communication triggering event, such as an identifier of the communication, are then identified (step 604). For example, if the communication is an inbound or outbound voice call, an identifier of the communication can be a telephone number associated with the voice call. If the communication is an inbound or outbound SMS message, an identifier of the communication can be a telephone number or other identifier associated with the SMS message. If the communication is data being transmitted or received, an identifier of the communication can be a URL and/or an IP address. Other identifiers can also be associated with the communication, such as an alphanumeric contact name, the date of the communication, the time of the communication, an identifier of the wireless subscriber, an identifier of the particular wireless device 10, an identifier of the type of wireless device 10, an identifier of the type of operating system being used by the wireless device 10, or the like.

Once the identifier of the communication has been detected, it is sent to the tracking module 308 and/or the tracking module 310 for comparison with the proxy identifier database 500 (step 606). If the identifier of the communication is included in the proxy identifier database 500, its corresponding proxy identifier and, thus, proxy, is identified (step 608). For example, if a call is being placed to the number 123-456-7890, then the tracking module 310 identifies that the corresponding proxy for that communication is the friends and family proxy. In another example, if a call is being placed on Dec. 25, 2012, then the tracking module 310 identifies that the corresponding proxy for that communications is the holiday proxy.

If the identifier of the communication is not included in the proxy identifier database 500, the communication is assigned to a default metered proxy (step 610). The metered proxy can be used for some or all communication that is charged against the wireless subscriber's plan.

After the proxy corresponding to the communication is identified in either step 608 or step 610, the proxy identifier is forwarded to the communications processing module 402, which selects the proxy in the proxy module 406. The proxy module 406 includes two or more proxies that are identified by, for example, an alphanumeric identifier. Based on the alphanumeric identifier, the data for the communication is routed from the communications processing module 402 to the transceiver 16 through the proxy module 406. In some implementations, the proxy module 406 may append its identifier to a packet header or body carrying the data for the communication The usage information may then be sent from the proxy to the tracking module 310 of the wireless device 10 and/or the tracking module 308 of the MVNO cloud 306 (step 614). In an exemplary implementation, each proxy in the proxy module 406 can determine the time aspects of the communication routed through it and forward the aspects with other communications information to the usage information memory 408 and/or the tracking module 308. The time, amount of data, and the like for each communication can be forwarded to the usage information memory 408 immediately following the end of the communication, in predetermined time intervals, or in response to a request from the tracking module 310. For example, the aspects of communications from the various proxies can be forwarded to the usage information memory 408 once a day, once every 12 hours, or once every six hours. The usage information memory 408 of the tracking module 310 then accumulates and stores the communications information to track the usage of the wireless device 10.

In some implementations, the MVNO cloud 306 including the tracking module 308 can determine the usage of the mobile phone based on the proxy identifier appended to a packet header or based on usage information received from the tracking module 310. The MVNO cloud 306 can receive usage information from the tracking module 310 via an SMS message, an email, in data form, or the like. The usage information can include one or more of an identifier of the wireless subscriber, an identifier of the wireless device 10, an identifier of one or more communications, and the units of usage associated with each proxy, such as time of voice calls, number of SMS messages, amount of data, or the like. The usage information can be received by the MVNO cloud 306 in encrypted form.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a," "an," and "the" include plural referents unless the content clearly indicates otherwise. Thus, for example, reference to "a proxy" includes two or more proxies.

Reference to "one implementation," "some implementations," "other implementations," or "one or more implementations" means that a particular feature, structure, or characteristic described in connection with the implementation is included in at least one implementation but not necessarily to the same implementation or separate implementations that are mutually exclusive. Moreover, various features may be exhibited by some implementations and not by other implementations. Similarly, various requirements are described that may be requirements for some implementations but not other implementations.

A number of implementations have been described. Nevertheless, it will be understood that various modifications may be made without departing from the spirit and scope of the claims. For example, the wireless device 10 may not utilize a UICC or SIM card 22. The wireless device 10 may operate using any mobile operating system.

Although for the sake of clarity and simplicity, exemplary implementations of the invention is described in terms of a wireless device 10 used in a MVNO communications system, it should be understood that the invention is not limited to these exemplary implementations. Alternative implementations of the invention may include any wireless device with internally stored rules of operation that may be changed together with other mobile communications devices within a select group via a broadcast message received from the MVNO. Accordingly, other implementations are within the scope of this application.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method for tracking usage of a wireless device, comprising:
monitoring a communications trigger to initiate communication with a wireless device over a wireless network;
determining an identifier of the communication;
comparing the identifier of the communication with a database including two or more communication identifiers and two or more wireless usage proxy identifiers, each communication identifier being associated with a corresponding wireless usage proxy identifier;
identifying, in response to a comparison of the identifier of the communication with the database, a wireless usage proxy corresponding with the identifier of the communication;
monitoring data from the wireless device to a destination through the identified wireless usage proxy; and
receiving usage of the wireless device from the identified wireless usage proxy to track the usage of the wireless device.

2. The method of claim 1, wherein monitoring the communications trigger comprises receiving, from a user of the wireless device, an indication of a destination that the user of the wireless device wants to communicate with over the wireless network.

3. The method of claim 2, wherein monitoring the communications trigger comprises receiving an indication that the user of the wireless device has entered a phone number or selected a contact in an address book of the wireless device.

4. The method of claim 1, wherein monitoring the communications trigger comprises receiving, from the wireless network, an indication that a third party wants to communicate with the wireless device over the wireless network.

5. The method of claim 1, wherein monitoring the communications trigger comprises receiving, from an application on the wireless device, an indication of a destination that the application wants to communicate with over the wireless network.

6. The method of claim 1, wherein the identifier of the communication is at least one of a telephone number, a date, a time, a contact name, a brand, a device model, a uniform resource locator, or an Internet Protocol address.

7. The method of claim 1, wherein data from the wireless device to the destination is voice data, Short Message Service data, or data.

8. The method of claim 1, wherein monitoring data from the wireless device to the destination through the identified wireless usage proxy comprises monitoring the data from the wireless device to the destination through the identified wireless usage proxy located in the wireless device.

9. The method of claim 1, wherein receiving the usage of the wireless device from the identified wireless usage proxy to track the usage of the wireless device comprises receiving, at the wireless device, the usage of the wireless device from the identified wireless usage proxy to track the usage of the wireless device.

10. The method of claim 1, wherein receiving the usage of the wireless device from the identified wireless usage proxy to track the usage of the wireless device comprises receiving, at a system communicating with and different from a provider of the wireless network, the usage of the wireless device from the identified wireless usage proxy to track the usage of the wireless device.

11. The method of claim 1, wherein the usage of the wireless device includes at least one of a number of voice minutes, a number of Short Message Service messages, and an amount of data.

12. The method of claim 1, wherein:
comparing the identifier of the communication with the database including the two or more communication identifiers and the two or more wireless usage proxy identifiers comprises determining that the identifier of the communication is included in the database and identifying the corresponding wireless usage proxy identifier; and
identifying the wireless usage proxy corresponding with the identifier of the communication comprises identifying, in response to the identification of the corresponding wireless usage proxy identifier, a wireless usage proxy corresponding with the identifier of the communication.

13. The method of claim 1, wherein:
comparing the identifier of the communication with the database including the two or more communication identifiers and the two or more wireless usage proxy identifiers comprises determining that the identifier of the communication is not included in the database and identifying a default metering wireless usage proxy identifier; and
identifying the wireless usage proxy corresponding with the identifier of the communication comprises identifying, in response to the identification of the default metering wireless usage proxy identifier, the default metering proxy.

14. The method of claim 1, wherein the database including the two or more communication identifiers and the two or more wireless usage proxy identifiers comprises a lookup table including a communication identifiers field and a wireless usage proxy identifiers field.

15. The method claim 1, wherein monitoring the data from the wireless device to the destination through the identified wireless usage proxy comprises monitoring the data from the wireless device to the destination through a wireless usage proxy module in the wireless device.

16. The method of claim 1, wherein receiving the usage of the wireless device from the identified wireless usage proxy to track the usage of the wireless device comprises receiving the usage of the wireless device from the identified wireless usage proxy following an end of the communication to track the usage of the wireless device.

17. The method of claim 1, wherein receiving the usage of the wireless device from the identified wireless usage proxy to track the usage of the wireless device comprises receiving the usage of the wireless device from the identified wireless usage proxy at a predetermined time interval to track the usage of the wireless device.

18. The method of claim 1, wherein the wireless device includes a mobile phone.

19. A system comprising at least one processor connected to at least one memory, wherein the at least one processor is configured to:
monitor a communications trigger to initiate communication with a wireless device over a wireless network;
determine an identifier of the communication;
compare the identifier of the communication with a database including two or more communication identifiers and two or more wireless usage proxy identifiers, each communication identifier being associated with a corresponding wireless usage proxy identifier;

identify, in response to a comparison of the identifier of the communication with the database, a wireless usage proxy corresponding with the identifier of the communication;

monitor data from the wireless device to a destination through the identified wireless usage proxy; and receive usage of the wireless device from the identified wireless usage proxy to track the usage of the wireless device.

20. A tangible non-transitory memory storing a computer program, the computer program comprising one or more code segments that, when executed, cause at least one processor to:

monitor a communications trigger to initiate communication with a wireless device over a wireless network;

determine an identifier of the communication;

compare the identifier of the communication with a database including two or more communication identifiers and two or more wireless usage proxy identifiers, each communication identifier being associated with a corresponding wireless usage proxy identifier;

identify, in response to a comparison of the identifier of the communication with the database, a wireless usage proxy corresponding with the identifier of the communication;

monitor data from the wireless device to a destination through the wireless usage identified proxy; and receive usage of the wireless device from the identified wireless usage proxy to track the usage of the wireless device.

* * * * *